United States Patent [19]
Toyoda

[11] 3,824,608
[45] July 16, 1974

[54] ELECTRIC SHUTTER CIRCUIT
[75] Inventor: Kenji Toyoda, Tokyo, Japan
[73] Assignee: Nippon Kogaku K. K., Tokyo, Japan
[22] Filed: Sept. 13, 1973
[21] Appl. No.: 396,705

[30] Foreign Application Priority Data
Sept. 20, 1972 Japan............................. 47-93679

[52] U.S. Cl.................. 354/50, 307/293, 307/311, 317/124, 317/157, 328/2, 328/74, 328/131, 354/60
[51] Int. Cl....... G03b 7/08, G01j 1/44, H03k 19/14
[58] Field of Search......... 95/10 CE, 10 CT, 53 EB; 307/311, 293; 328/2, 48, 74, 131; 317/124, 157

[56] References Cited
UNITED STATES PATENTS
3,677,151  7/1972  Werner et al..................... 95/10 CE
3,703,130  11/1972  Watanake........................ 95/10 CT
3,742,826  7/1973  Kohtoin........................... 95/10 CT
3,748,979  7/1973  Wada................................ 95/10 CT Primary Examiner—Joseph F. Peters
Attorney, Agent, or Firm—Fitzpatrick, Cella, Harper & Scinto

[57] ABSTRACT

An electric shutter control includes a first circuit which counts and memorizes the number of first pulses, which is inversely proportional to the intensity of light reflected from an object to be photographed, and generates and counts the number of second pulses proportional to the time elapsed from the time the shutter is opened, and a second circuit, which directly compares the numbers of the first and second pulses and deenergizes an electromagnet when both numbers coincide with each other to close the shutter.

14 Claims, 5 Drawing Figures

ELECTRIC SHUTTER CIRCUIT

BACKGROUND OF THE INVENTION

1. Field of the Invention

This invention relates to an electric shutter, and more particularly to an electric shutter of so-called TTL cameras, wherein one or more light accepting elements are arranged behind the phototaking lens, to be capable of providing an accurate exposure time.

2. Description of the Prior Art

Electric shutter circuits used in this kind of camera which convert the intensity of light incident from an object to be photographed into electric pulses, counts and memorizes the pulses by means of a counting circuit, and controls the exposure time according to the number of pulses so memorized has hitherto been known. These conventional circuits have the advantages described below.

1. Employment of counter circuits as a means of memorization enables these circuits to eliminate the inaccuracy in memorized value caused by leakage of condensers, which is inherent in the methods in which condensers are used as memory means.
2. Since digital display devices such as light emitting diodes can be used as the indicator to let a photographer know in advance the exposure time to be controlled, the exposure time is more easily visible and the devices are more resistant to external forces than the conventional methods which employ an ammeter as the indicator.

However, these conventional circuits have the disadvantages of being so constituted as to convert the number of pulses memorized in the counter circuit into analog signals such as the magnitude of current, to charge a timing condenser with the current, to detect the point where the voltage across the timing condenser reaches a fixed value, to deenergize the electromagnet of the shutter, and finally to close the shutter. Accordingly, these circuits require a D-A converter. This not only complicates the circuits but also causes erroneous exposures to be made by such factors as the leakage current of the timing condenser.

SUMMARY OF THE INVENTION

I have conceived means by which I am able to realize a simple and highly accurate electric shutter circuit in which the above mentioned disadvantages inherent to the conventional circuits heretofore used are eliminated.

According to this invention, a counter circuit memorizes the number of first pulses which is inversely proportional to the intensity of light coming from an object to be photographed, and at the same time generates second pulses, the number of which is proportional the time elapsed from the instant the shutter is opened, and at the point where the numbers of said first and second pulses coincide with each other, an electromagnet is operated to close the shutter. In other words, the numbers of pulses, which are digital quantities, are directly compared to eliminate the defects inherent to the conventional systems.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein.

DESCRIPTION OF THE PREFERRED EMBODIMENTS

Figure 1:
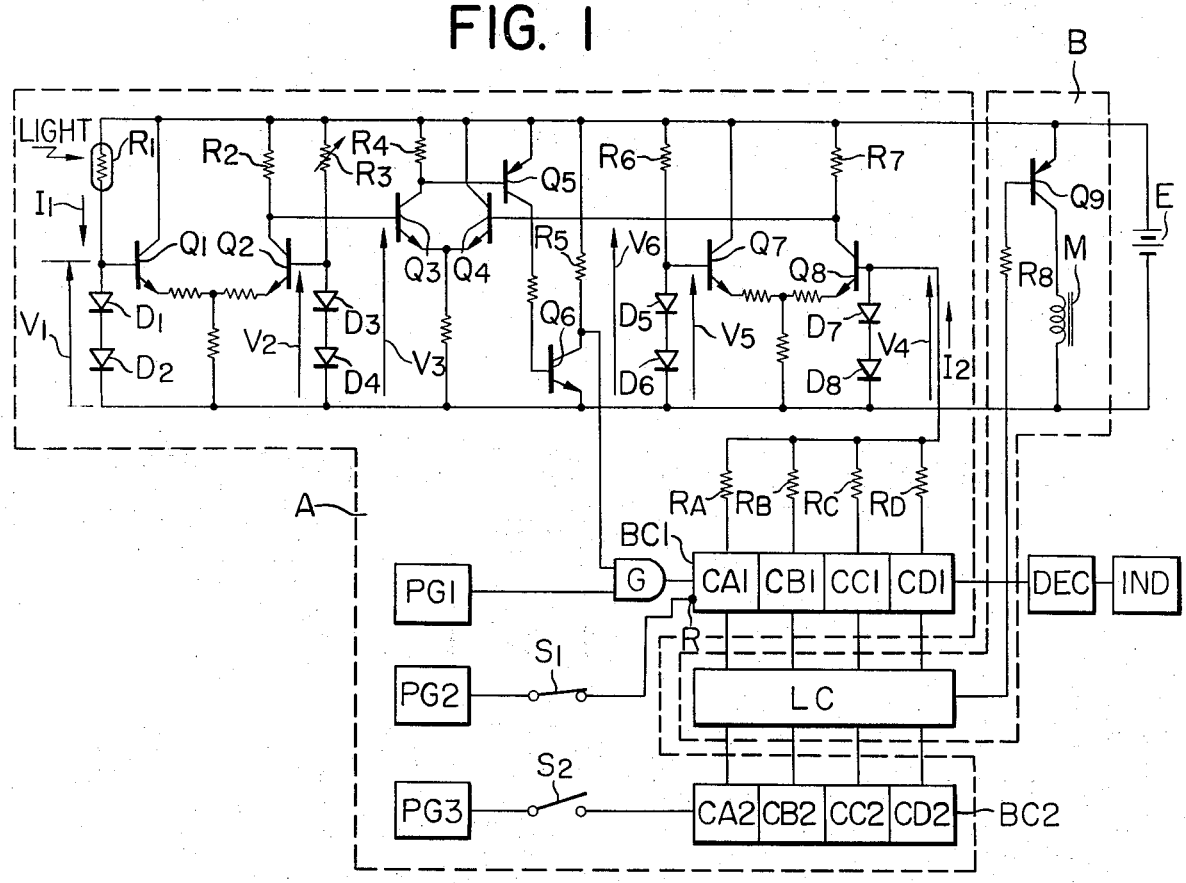
FIG. 1 illustrates a circuit for the first embodiment.

FIG. 1 shows a circuit configuration of the first embodiment of this invention, in which R1 is a photoconductor installed on the camera body in well known manner to receive the light coming from the object to be photographed, D1 and D2 are diodes which are connected to the power source E in series with the photoconductor R1. R3 is a variable resistor the resistance of which varies in accordance with the aperture setting of the phototaking lens and with the sensitivity of the film used. Diodes D3 and D4 are connected in series with the variable resistor R3 and power source E.

Transistors Q1 and Q2 form a first differential amplifier circuit, the bases of which are connected to the junction point of the above-mentioned photoconductor R1 and diode D1 and the junction point of the variable resistor R3 and diode D3, respectively, and R2 is a load resistor used to pick up the output voltage of the first differential amplifier circuit.

On the other hand, PG1 is a pulse generator which delivers the pulses generated at a fixed cycle to a binary counter circuit BC1 by way of AND gate circuit G. The output of this binary counter circuit is connected to an indicator IND by way of a decoder DEC.

PG2 is a reset pulse generator which generates reset pulse of sufficiently longer period than the out pulse of the pulse generator PG1. The reset pulses so generated are connected to a reset terminal R of the binary counter circuit BC1 by way of a switch S1 which is opened interlocking with the shutter button of the camera.

CA1, CB1, CC1 and CD1 are the flip-flops forming individual bits of the binary counter circuit BC1, respectively. Each one of the outputs of these flip-flops are connected, respectively, to the weighting resistors RA, RB, RC and RD, respectively, and the others are connected to the logic circuit LC later to be described.

The other ends of the fixed resistors RA, RB, RC and RD are joined and connected to the diodes D7 and D8 and the junction is connected to the base of the transistor Q8.

Transistors Q7 and Q8 form a second differential amplifier circuit and the base of the transistor Q7 is connected to the junction of the fixed resistor R6 and diodes D5 and D6.

Fixed resistor R4 and transistors Q3 and Q4 form a comparison circuit and the bases of the transistors Q3 and Q4 are connected to the output terminals of the first and second differential amplifier circuits mentioned above. Transistors Q5 and Q6 form a switching circuit which receives the output of the above-mentioned comparison circuit and supplies its own output to the above-mentioned AND gate G.

The comparison circuit, switching circuit, and AND gate circuit are arranged to perform the following operation. When the input voltages applied to the bases of the transistor Q3 and Q4, respectively, coincide with each other, the state of the comparison circuit is reversed and inhibits the transfer of pulses generated in the pulse generator PG1 to the binary counter circuit BC1 by activating the switching and AND gate circuits G.

Figure 4:
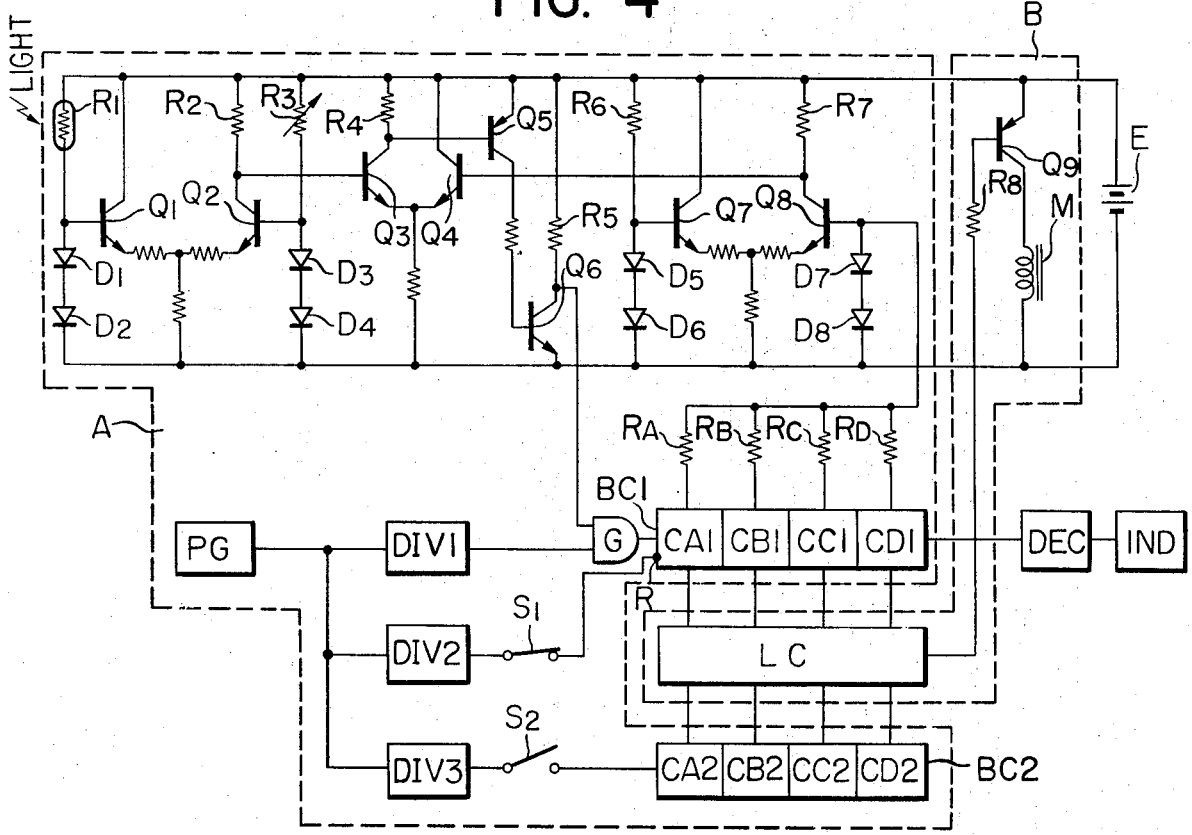
FIGS. 4 and 5 are circuit diagrams of other embodiments.
Figure 5:
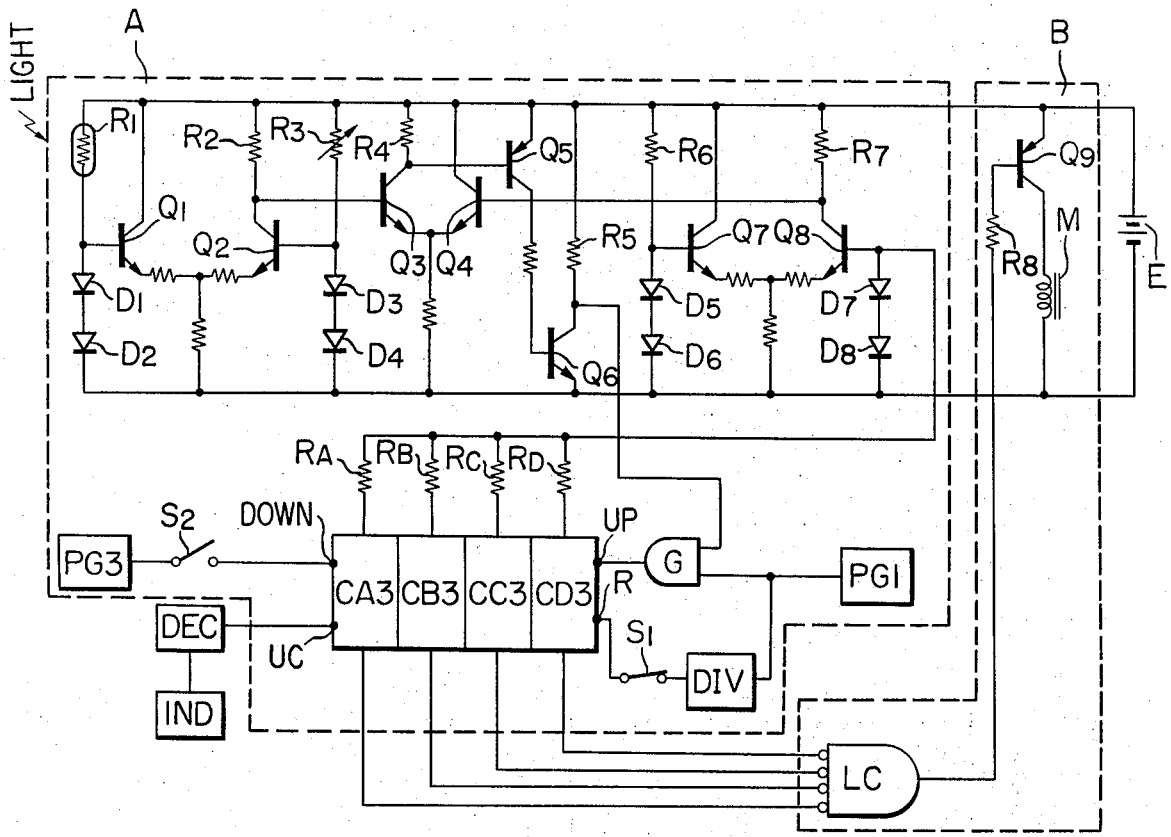

On the other hand, a pulse generator PG3 generates pulses at a fixed cycle and delivers them to the binary counter circuit BC2 by way of the switch S2. The switch S2 closes at the same time the shutter is opened and accordingly the binary counter circuit BC2 is so constructed as to count the number of pulses which is proportional to the time elapsed from the instant the shutter is opened. CA2, CB2, CC2 and CD2 are flip-flops forming individual bits of the binary counter circuit BC2 respectively. The outputs of each flip-flop are connected to the above-mentioned logic circuit LC. The circuit A which is surrounded by dotted lines in FIGS. 1, 4 and 5 is a circuit which counts the number of first pulses which is inversely proportional to the intensity of light coming from the object, memorizes it, and, at the same time, generates and counts the number of second pulses which is proportional to the time elapsed from the instant the shutter is opened.

Figure 2:
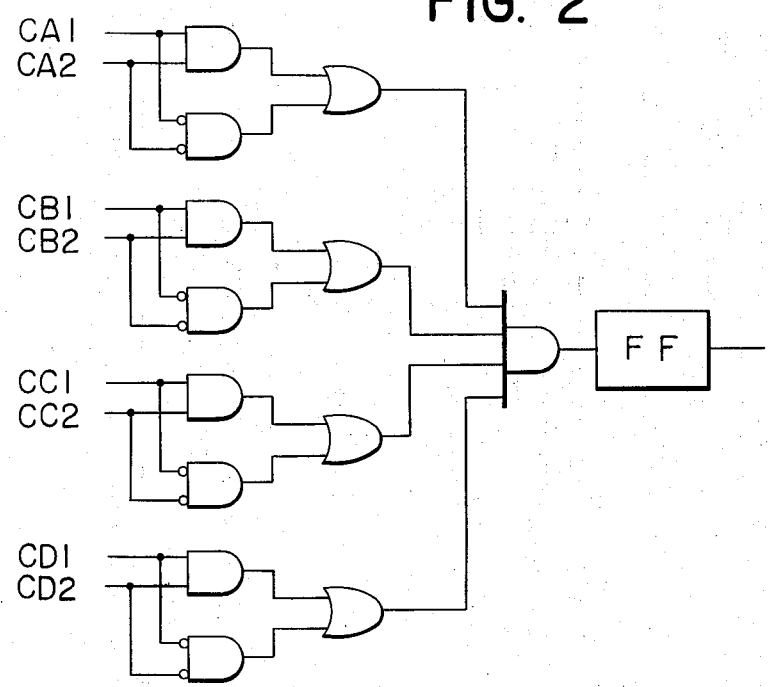
FIG. 2 illustrates in detail a part of FIG. 1.

As shown in FIG. 2, the logic circuit LC consists of 13 gate circuits and one flip-flop FF. The flip-flop FF works and produces a high level output and holds the condition thereafter only when the states of the corresponding bits of two binary counter circuits BC1 and BC2, in other words CA1 and CA2, CB1 and CB2, CC1 and CC2, CD1 and CD2, are all identical. This means that if the input of the flip-flop FF is assumed to be $X$, then $X$ is expressed by the following logical expression:

$$X = (CA1 \cdot CA2 + \overline{CA1} \cdot \overline{CA2})(CB1 \cdot CB2 + \overline{CB1} \cdot \overline{CB2})(CC1 \cdot CC2 + \overline{CC1} \cdot \overline{CC2})(CD1 \cdot CD2 + \overline{CD1} \cdot \overline{CD2})$$

1

The output of the logic circuit is connected to the base of the transistor Q9 by way of a fixed resistor R8. M is an electromagnet which is connected to the collector of the above-mentioned transistor Q9. When the circuit is in operating state, the output of the logic circuit LC is normally at low level, therefore the transistor Q9 becomes conductive and the electromagnet M is energized to hold the shutter closing element, so that the shutter is prevented from closing. However, when the output of the logic circuit LC reaches a high level as mentioned above, the transistor Q9 becomes nonconductive, the electromagnet M is deenergized to release the shutter closing element and thus to close the shutter.

The circuit B, which is surrounded by dotted lines, is a circuit which directly compares the number of the first pulses and number of the second pulses and, when both numbers are identical, deenergizes the electromagnet M to close the shutter.

The operation of this circuit will now be described. The resistance of the photoconductor R1 has the following well known relationship to the brightness B of the object to be photographed:

$$R1 = K1\, B^{-\gamma}$$

2

Where $K1$ and $\gamma$ are constants inherent to the photoconductor. The current $I1$ which flows through the diodes D1 and D2 and the voltage drop $V1$ produced at both ends of the diodes have the following relationship:

$$V1 = 2h \log (I1/Is)$$

3 where, $h = kT/q$ in which,
 $k$: Boltzmann's constant
 $T$: Absolute temperature
 $q$: Elementary electric charge
$Is$ is the backward saturation current of the diode. Taking into consideration the voltage drop caused by the photoconductor R1, we obtain $$R1 I1 + V1 = E$$

4 where, $V1$ is the voltage across the diodes D1 and D2. If $E$ is sufficiently larger than $V1$, then $V1$ can be ignored, and we obtain $$I1 = E/R1$$

5 substituting the formula (2) into the formula (5) and substituting the reset obtained into the formula (3), we obtain the following formula:

$$V1 = 2h \log (EB^\gamma /K1Is) = 2\gamma\, h \log B + K2$$

6 where, $K2 = 2h \log (E/K1Is)$
Next, the variable resistor R3 is so constructed as to have the following relationship with respect to the F number A of the camera diaphragm and to the sensitivity S of the film used.

$$R3 = K3\, (S/A^2)^\gamma$$

7 where, K3 is a constant.
The voltage $V2$ across the diodes D3 and D4 is obtained similar to the case of the photoconductor R1 as follows:

$$V2 = 2h \log [E/K3Is\,(A^2)/S^\gamma\,] = 2\gamma h \log (A^2/S) + K4$$

8 where, $$K4 = 2h \log (E/K3Is)$$

As is well known, the output voltage $V3$ of the first differential amplifier circuit consisting of the transistors $Q1$ and $Q2$ is proportional to the difference between two input voltages. Accordingly, $V3$ is represented by the following formula:

$$V3 = A1 (V1 - V2)$$
$$= \gamma h [\log B - \log (A^2/S)] + A1(K2 - K4) = 2A1 \gamma h \log Bs/A^2 + A1 (K2 - K4)$$

9 where, $A1$ is the amplification factor of the first differential amplifier circuit.

On the other hand, although the pulses generated by the pulse generator PG1 are counted by the binary counter circuit BC1 by way of the AND gate G, if at the time of measuring the light, the switch S1 is kept closed, the binary counter circuit BC1 is periodically reset to zero by the reset pulses coming from the reset pulse generator at time intervals which are sufficiently large compared with the period of the pulses generated by the pulse generator PG1.

The bits CA1, CB1, CC1 and CD1 of the binary counter circuit BC1 count the pulses with the weights of 1, 2, 4 and 8, respectively. The resistances of the weighting resistors RA, RB, RC and RD which are connected to these bits, respectively, are determined to be RA : RB : RD = 8 : 4 : 2 : 1. The output of each bit of the binary counter circuit BC1 is so designed as to be equal to the power supply voltage E when the output is at a high level. If the voltage drop caused by the diodes D7 and D8, as in the case of deriving the formulas (6) and (8) is ignored, only the bit CA1 becomes a high level when one pulse is counted and a current $E/RA$ flows through the diodes D7 and D8. When two pulses have been counted, only the bit CB1 becomes a high level and the current $E/RB$, in other words $2E/RA$, flows. When three pulses have been counted both bits CA1 and CB1 become high level and the current $E/RA + E/RB = 3E/RA$ flows through the diodes D7 and D8. Similarly, if the number of pulses counted is $n$, then the current $T2$ which runs through the diodes D7 and D8 can be expressed by the following formula:

$$I2 = nE/RA$$

10

Accordingly, the voltage drop $V4$ across the diodes D7 and D8 is given by $$V4 = 2h \log (I2/Is)$$
$$= 2h \log (nE/IsRA)$$
$$= 2h \log n + K5$$

11 where, $K5 = 2h \log (E/IsRA)$
$V4$ is the input of the second differential amplifier circuit consisting of the transistors Q7 and Q8. Since the other input of this differential amplifier circuit is the voltage $V5$ which is generated across the diode D5 and D6, the output voltage $V6$ is given as follows by expressing the amplification factor of the second differential amplifier circuit with A2:

$$V6 = A2 (V5 - V4) = -2A2h \log n + A2 (V5 - K5)$$

12

The binary counter circuit BC1 starts counting immediately after it is reset by the pulse coming from the pulse generator PG2 and, with the increase in the number of the pulses, $V4$ is increased because of the relationship shown in the formula 11 and on the contrary $V6$ is decreased. When $V6$ equals $V3$, which is determined by the formula 9, the comparison circuit consisting of the transistors Q3 and Q4, the switching circuit consisting of the transistors Q5 and Q6, and the AND gate circuit G start operation, cut off the connection between the pulse generator PG1 and the binary counting circuit BC1 and, as a result, BC1 stops counting. The number of the pulses $n1$ that have thus far been counted by the binary counter circuit BC1 can be obtained as follows by connecting the right sides of the formulae 9 and 12 with the sign of equality:

$$2A1\gamma h \log BS/A^2 + A1 (K2 - K4)$$
$$= -2A2h \log n1 + A2 (V5 - K5)$$

Consequently, $$2(A1\gamma h \log (BS/A^2) + A2h \log n1)$$
$$= A2(V5 - K5) - A1 (K2 - K4)$$

13

If, at this point, the circuit constants are so determined as the amplification factors A1 and A2 of the first and second differential amplifier to be $A1\gamma = A2$, then we obtain: $\log (BSn1/A^2) = 1/2h (V5 - K5 - K2 - K4/\gamma_4$ Since the right side of the formula (14) becomes a constant, if we assume a new constant $K6$, we obtain:

$$n1 = K6 \cdot A^2/BS$$

15

This means that the pulse $n1$ is inversely proportion to the intensity of the light (brightness of the object). As was described before, the binary counter circuit BC1 stops counting at the number of pulses $n1$ shown in the formula (15) and holds the value until the next reset pulse arrives from the reset pulse generator PG2. After a certain period of time, when a reset pulse is delivered from PG2, the binary counter circuit is reset to zero, returned to the original state, and starts counting. The same operation is repeated.

As described so far, the binary counter circuit BC1 repeats the operation of counting the number of pulses inversely proportional to the intensity of light at that time, and being reset by the reset pulse.

When the shutter button (not illustrated) of the camera is depressed, the switch S1, linked to the shutter button, is first opened. The reset pulse from the reset pulse generator PG2 is no longer transmitted to the binary counter circuit BC1, and the number of pulses counted thereafter is held until the shutter operation is ended and the switch S1 is closed again. In other words, the number of pulses $n1$ is inversely proportional to the intensity of the light at that time is stored in BC1.

After a sufficient time has elapsed for the number of pulses to be memorized, if the shutter button is further depressed, the shutter is opened and at the same time the switch S2 is closed, and the binary counter circuit BC2 starts counting the pulses delivered from the pulse generator PG3. The number of pulses $n1$ memorized in the binary counting circuit BC1 and the number of pulses $n2$ counted by the binary counting circuit BC2 are compared by the logic circuit LC as described above and, at the point where $n1 = n2$, the output of LC is switched from a low level to a high level, the transistor Q9 is made nonconductive to demagnetize the electromagnet M. As a result, the shutter closing element is released and the shutter is closed. Let $\tau$ be the period of pulses generated by the pulse generator PG3, then the time spent between the instant the switch S2 is closed and the instant the shutter is closed, in other words the exposure time $t1$ is given by $$t = n2\ \tau = n1\ \tau \quad (16)$$

Since $n1$ has a relationship shown by the formula (15), $$t = K6\ \tau \cdot A^2/BS \quad (17)$$

If here the value of $K6\ \tau$ is determined appropriately, the formula (17) becomes the formula of correct exposure well known in photography. In other words, the shutter is closed after an elasped exposure time which provides a correct exposure. If the number of pulses counted by the binary counter circuit BC1 in the light measuring condition before depressing the shutter is applied through an appropriate decoder DEC to digital indicator IND such as a light emitting diode or a liquid crystal, the exposure time to be controlled can be known by a photographer in advance. In the embodiment so far described, memorization was limited by cutting off the reset pulse going to the binary counter circuit BC1.

In this method, sometimes the counting of the binary counter circuit BC1 may be incomplete if the period of time between the instant the switch S1 is opened and the instant the shutter is opened is at least long enough to be equal to the period of the reset pulses.

Figure 3:
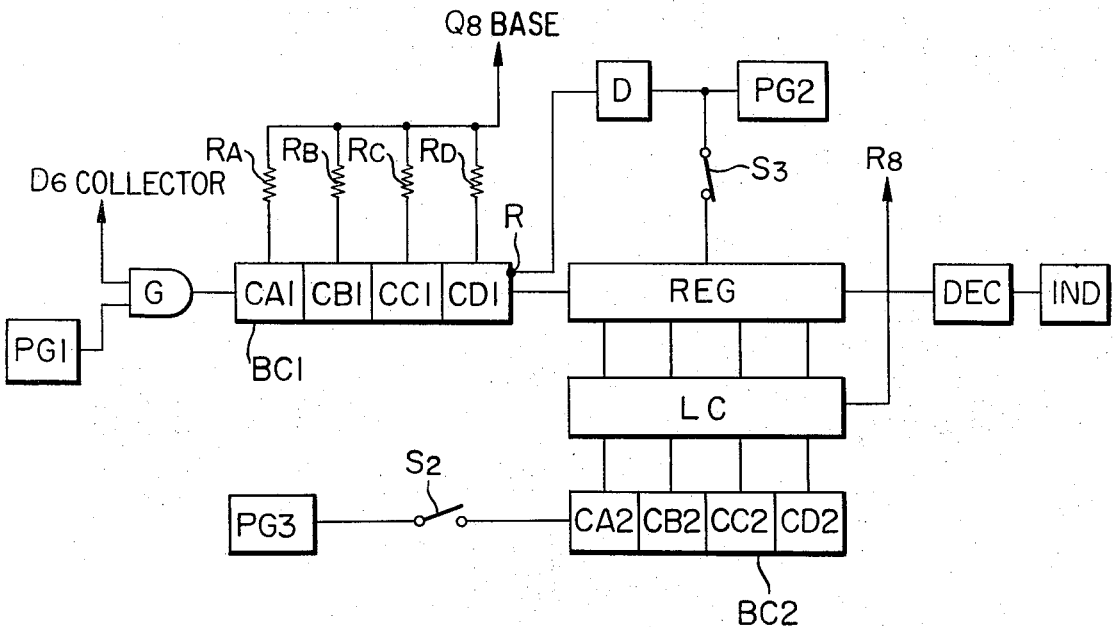
FIG. 3 is a circuit diagram representing a part of the second embodiment.

This defect is obviated by employing the circuit configuration which shows a portion of the second embodiment shown in FIG. 3. Here, although the function of the binary counter circuit BC1 at the time of measuring the light is the same as the first embodiment described previously, the circuit BC1 is not directly connected to the logic circuit LC and a parallel register REG is connected to the logic circuit LC instead. The output of the binary counter circuit BC1 is connected to the register REG. The reset pulse generated by the reset pulse generator PG2 is also the clock pulse of the register REG, and the contents of the circuit BC1 are transferred to REG unchanged only when a pulse is sent to the register REG from the generator PG2. D is a delay circuit which sends reset pulse to the reset terminal R of the circuit BC1 to reset the circuit BC1 after the content of the circuit BC1 is transferred to the register REG as mentioned above. If these operations are repeated, the number of pulses which is inversely proportional to the intensity of light at one clock before is always stored in the register REG regardless of whether the circuit BC1 is midway of the count or not. If here the switch S3, linked to the shutter button or to the mirror mechanism etc. of a single lens reflex camera, is opened, the number of pulses inversely proportional to the intensity of light at that time is stored in the register REG. The operation thereafter is similar to that of the previously mentioned embodiment. In the first and second embodiments, a four-digit binary counter circuit was used as BC1 or BC2. However, binary counter circuits having a larger number of digits may be used depending on the control range of exposure time. If necessary, a counter circuit other than binary counter circuit, such for example as a counter circuit employing reversed binary codes or binary coded deciman codes, can be used with the same effect.

Furthermore, although in the first embodiment shown in FIG. 1, three pulse generators PG1, PG2 and PG3 are used, it is possible to put them together into one or two by using appropriate frequency divider circuits or selector switches as shown in FIG. 4. In another embodiment of this invention shown in FIG. 4, PG is a pulse generator which generates pulses having a fixed period. The pulses generated here are sent to the frequency dividers DIV1, DIV2, and DIV3, respectively, and there, frequency divided into three kinds of pulses having periods different from each other. The output pulses of DIV1, DIV2, and DIV3 are the same as the output pulses of PG1, PG2, and PG3 of FIG. 1 respectively, and accordingly, they operate in quite the same way.

With such a construction, we obtain quite the same effect as the first embodiment shown in FIG. 1 with the aid of one pulse generator. Moreover, as the pulse generator, we can consider the use of various generators employing, for example, a stable multivibrator, crystal oscillator, LC oscillator circuit, or those employing mechanical vibration such as a turning fork.

Although in this embodiment, two counter circuits are used, one for storage and the other for counting the pulses which are proportional to the time elasped from the instant the shutter is opened, the same effects can be realized with a single counter circuit by using a so-called up-and-down counter as shown in FIG. 5 and by counting down the number of pulses memorized with the aid of pulses which are proportional to the time elapsed from the point the shutter is opened to detect the point where the memorized value becomes zero. This will be described hereinafter.

In FIG. 5, which illustrates another embodiment of this invention, UC is a binary up-down counter having three inputs UP, DOWN, and R(reset). At the time of measuring the light only the UP input is connected to the pulse generator PG1 by way of the AND gate circuit G. Therefore, the UC counter works quite the same as the embodiment shown in FIG. 1. Here the reset pulse generator PG2 shown in FIG. 1 is omitted by applying the output of the pulse generator to the reset terminal R of the counter UC by way of the frequency divider DIV and the switch $S_1$.

When the shutter button is depressed, the switch $S_1$ is opened first, and the pulses inversely proportional to the intensity of the light coming from the object are memorized similar to the previous embodiment. When the shutter button is depressed further, the shutter is opened simultaneously with the closure of the switch $S_2$ and, since the pulse generator PG3 is connected to the DOWN terminal of the counter UC, the pulses stored in the counter UC are counted down. When the number of pulses remaining in the counter UC becomes zero, in other words, when the number of pulses memorized equals the number of pulses coming from pulse generator PG3, the output of the logic circuit LC becomes high level, the transistor Q9 is cut off, and the electromagnet M is demagnetized. In this case, if the binary up-down counter UC is so designed as not to count negative numbers, the logic circuit LC needs no more than one AND gate.

From the foregoing description, it will be seen that I contribute a shutter device by which I am able to realize a very correct exposure time control of simple construction because no condenser is employed in the memory and timing circuits and because the control is uneffected by the leakage current or capacity change of condensers caused by environmental conditions. Moreover, as the indicator used to let a photographer know in advance the exposure time to be controlled, the employment of easily visible and resistive-to-external-force digital indicators becomes possible. Furthermore, it is possible always to indicate the exposure time to be controlled which depends on the intensity of the light which varies with the occasion and time. Employment of IC (intergrated circuits) is also made easier.

I believe that the construction and operation of my novel shutter control device will now be understood, and that the advantages thereof will be fully appreciated by those persons skilled in the art.

I claim:

1. An electric shutter control device comprising:
    a first circuit for converting the intensity of light into a first electric signal proportional the logarithm of said intensity;
    a first pulse generator for generating first pulses having a fixed period;
    a first counter for counting said first pulses;
    a second circuit for converting the number of pulses counted on said first counter into a second electric signal proportional to the logarithm of said counter number;
    a comparison circuit for comparing said first electric signal and said second signal and generating a third electric signal when the first and second signals have come into a predetermined relationship;
    a GATE circuit between said first pulse generator and said first counter and adapted to employ the third signal to stop the counting of said first counter;
    a second pulse generator for generating second pulses at a fixed period; a second counter for counting said second pulses;
    means cooperating with a shutter start mechanism to start the counting of said second counter; and
    a third circuit containing a logic circuit for comparing the number of pulses counted on said first counter and the number of pulses counted on said second counter and, when the both are in coincidence, for operating an electromagnet to start the shutter closing operation.

2. An electric shutter device according to claim 1, in which said second circuit contains weighting resistors and diodes connected to said weighting resistors.

3. An electric shutter device according to claim 1, in which said first counter has a third pulse generator which resets periodically the number of pulses counted.

4. An electric shutter device according to claim 3, in which means is provided which cooperates with shutter releasing mechanism to stop the resetting of the first counter which is caused by third pulse generator.

5. An electric shutter device according to claim 1, in which said first counter is further provided with an indicating device which indicates the number of pulses counted on the first counter.

6. An electric shutter control device comprising;
    a first circuit for converting the intensity of light into a first electric signal proportional to the logarithm thereof;
    a first pulse generator for generating first pulses at a fixed period;
    a first counter for counting said first pulses;
    a second circuit for converting the number of pulses counted on said first counter into a second electric signal proportional to the logarithm thereof;
    a comparison circuit for comparing said first electric signals and said second electric signals and, when both come into a predetermined relationship, generating a third electric signal;
    a GATE circuit between said first pulse generator and said first counter and adapted to employ the third signal to stop the counting of said first counter;
    a third pulse generator for generating third pulses having a longer period than said first pulses;
    a register device for reading out the number of pulses stored in said first counter at the time of generating said third pulse and storing the number;
    a device for resetting said first counter after said register device has read out the number of pulses counted on said first counter;
    a second pulse generator for generating second pulses at a fixed period;
    a second counter for counting said second pulses;
    means cooperating with a shutter start mechanism to start the counting of said second counter; and
    a third electric circuit for comparing the number of pulses stored in said register device and the number of pulses counted on the second counter and, when both are in coincidence, to operate means for effecting a shutter closing operation.

7. An electric shutter device according to claim 6, in which said second circuit contains weighting resistors connected to said first counter and diodes connected to said weighting resistors.

8. An electric shutter device according to claim 6, wherein means are provided between said third pulse generator and said register device and which cut off third pulses, upon operation of a shutter releasing mechanism.

9. An electric shutter device according to claim 6, in which said register device is further provided with an indicating device which indicates the number of pulses stored in said register device.

10. An electric shutter control circuit comprising;
    a first circuit for converting the intensity of light into a first electric signal proportional to the logarithm thereof;
    an up-down counter having forward input terminals for counting the input pulses in positive direction and negative input terminal for counting the input signals in negative direction;
    a first pulse generator for generating first pulses having a fixed period in order to transmit them to the positive input terminal of said up-down counter;

a second circuit for converting the number of pulses counted on said up-down counter into a second electric signal porportional to the logarithm thereof;

a comparison circuit for comparing said first electric signals and said second electric signals and, when both have come into a predetermined relationship, for generating third electric signals;

a GATE circuit between said first pulse generator and said up-down counter and adapted to employ said third signals to stop the counting of said up-down counter;

a second pulse generator for generating second pulses at a fixed period;

means cooperating with shutter starting mechanism for connecting said second pulse generator to the negative input terminal of up-down counter and starting said up-down counter counting in negative direction;

a third circuit having a logic circuit which, when the number of pulses counted on said up-down counter has become zero, detects same and operates means to effect shutter closing.

11. An electric shutter device according to claim 10, in which said second circuit contains weighting resistors connected to said up-down counter and diodes connected to said weighting resistors.

12. An electric shutter device according to claim 10, in which said up-down counter further contains a third pulse generator which resets periodically said counting in forward direction.

13. An electric shutter device according to claim 12, in which said up-down counter is provided with a device cooperating with shutter release mechanism to stop the reset operation in said positive direction counting of said third pulse generator.

14. An electric shutter device according to claim 10, in which said up-down counter is provided with an indicating device to indicate the number of pulses counted.

* * * * *

UNITED STATES PATENT OFFICE
CERTIFICATE OF CORRECTION

Patent No. 3,824,608    Dated July 16, 1974

Inventor(s) KENJI TOYODA

It is certified that error appears in the above-identified patent and that said Letters Patent are hereby corrected as shown below:

Column 3, line 15, change "transistor" to -- transistors --.
Column 5, line 10, after "=" and before "yh", insert -- 2A1 --.
Column 6, line 34, change "K4/$\gamma_4$" to -- K4/$\gamma$ --;
    line 35, at end thereof, insert -- $_{14}$ --;
    line 63, change "nl is" to -- nl which is --.

Signed and sealed this 29th day of October 1974.

(SEAL)
Attest:

McCOY M. GIBSON JR.    C. MARSHALL DANN
Attesting Officer      Commissioner of Patents